United States Patent [19]
Watson

[11] Patent Number: 5,272,922
[45] Date of Patent: Dec. 28, 1993

[54] VIBRATING ELEMENT ANGULAR RATE SENSOR SYSTEM AND NORTH SEEKING GYROSCOPE EMBODIMENT THEREOF

[75] Inventor: William S. Watson, Eau Claire, Wis.

[73] Assignee: Watson Industries, Inc., Eau Claire, Wis.

[21] Appl. No.: 665,393

[22] Filed: Mar. 6, 1991

[51] Int. Cl.[5] .......................... G01P 9/04; G01C 19/56
[52] U.S. Cl. ......................................... 73/505; 33/318
[58] Field of Search ............ 73/505, 510, 504, 178 R; 33/318, 324; 364/453

[56] References Cited

U.S. PATENT DOCUMENTS

| | | | |
|---|---|---|---|
| 3,127,774 | 4/1964 | Fischer et al. | 73/504 |
| 3,424,010 | 1/1969 | Pollack | 73/504 |
| 4,791,815 | 12/1988 | Yamaguchi et al. | 73/505 |

Primary Examiner—John E. Chapman
Attorney, Agent, or Firm—Moore & Hansen

[57] ABSTRACT

An angular rate sensor system preferably comprising closely spaced vibrating drive and sensing elements in a paired tuning fork configuration mounted to rotate about a rotational axis oriented perpendicular to the sensitive axes. The rotational drive assembly includes an encoder to modulate sensing element orientation, and coupling means to transmit drive and output signals to and from the rotating elements. Each pair of sense and drive elements are disposed in non-aligned parallel side-by-side opposition across the axis of rotation. The elements may be carried on torsional masses including a resilient coupling therebetween. The angular rate sensor system may be utilized as a north-seeking gyroscope in applications such as mining, surveying, or artillery. The phase of the sinusoidal sensor output signal corresponds to the orientation between the sensitive axis of the sensing elements and the earth's angular rate vector to produce a reference to geographic north. The electronic filter includes a signal generator, two phase-locked loops, AC amplifiers, bandpass filter, comparator, counter-divider, and latch to iterate a steady phase reading. A settling time of approximately 30–60 seconds is required to resolve a heading reference within ±0.1° of geographic north. A two axis low bias embodiment of the angular rate sensor system may be utilized alone or in combination with a similar system to provide complete angular rate sensing along a desired common axis, or with a second stationary angular rate sensor to enhance the bandwidth and DC response of the stationary angular rate sensor.

44 Claims, 4 Drawing Sheets

VIBRATING ELEMENT ANGULAR RATE SENSOR SYSTEM AND NORTH SEEKING GYROSCOPE EMBODIMENT THEREOF

BACKGROUND OF THE INVENTION

This invention relates generally to angular rate sensors of the vibrating element type, and particularly to a north-seeking gyroscope incorporating vibrating drive and sensing transducers in a paired tuning fork configuration mounted to rotate about a rotational axis oriented perpendicular to the sensing axis of the transducers, and a two axis low bias angular rate sensor.

The use of piezoelectric ceramic crystals in a paired tuning fork configuration for angular rate sensing is well known to the art, with representative examples being shown in U.S. Pat. Nos. 4,628,734 to Watson and 4,671,112 to Kimura. In each of these systems a pair of drive elements (or transducers) are energized to induce flexure and controlled vibration of those drive elements, with that vibration being transferred to a pair of parallel and closely-spaced sensing elements which extend longitudinally from the drive elements and vibrate in opposition about a nodal axis. Spatial movement of the vibrating sensor elements induces a sensed output signal that may be monitored and filtered to characterize the angular rate of the sensing elements and therefore the physical object to which the sensing elements are mounted.

U.S. Pat. No. 2,716,893 to Birdsall represents one of the initial disclosures of the use of piezoelectric crystal elements mounted on a rotor to sense acceleration signals which may be modulated by rotation of that rotor to derive an angular rate. The two elements in Birdsall '893 are not energized to induce flexure and vibration, but instead depend upon momentary physical displacement of the elements from the instantaneous plane of rotation of the elements about the axis of rotation of the rotor to induce stress forces on the elements caused by angular rates and accelerations. The magnitude of these stress forces are proportional to both the angular velocity (spin rate) of the rotor and the separation distance between the two elements perpendicular to the rotational axis of the rotor. While the scale factor and sensitivity of the Birdsall '893 system increase with the spin rate of the rotor and separation distance between the elements, its susceptibility to external vibrations and noise similarly increases. Moreover, the Birdsall '893 system does not measure angular rate per se, but rather requires derivation of an angular rate from measurement of acceleration forces.

U.S. Pat. No. 4,444,053 to Rider discloses an inertial sensor for aviation attitude and heading reference systems utilizing four transducer elements on a rotor to measure angular velocity and linear acceleration. The Rider '053 inertial sensor is effectively an operable embodiment of the system described in Birdsall '893 made feasible and competitive with conventional gyroscopes by improvements in circuitry and sensor element construction achieved since the time of Birdsall '893. Because the available bandwidth depends upon the rotor spin rate, the Rider '053 system must preferably be operated at its highest practical spin rate of 52 Hz (3,120 rpm), which is between one fourth and one eighth the normal spin rate of a conventional gyro. The system also weighs nearly 7 kg (15 lbs) and constitutes a significant expenditure.

North-seeking gyroscopes or gyrocompasses are traditionally characterized by reference to a freely rotating gyroscope rotor having damped precession about its own axis of rotation which naturally aligns parallel to the earth's axis of rotation (spin axis) and perpendicular to the local centripetal acceleration vector due to the effective torque induced by the horizontal component of the coriolis force. However, because the rate of change of the gyroscope's angular momentum vector equals the applied torque, a gyroscope having a large angular momentum vector influenced by a comparatively small torque (i.e., proportional to the earth's coriolis force) will require significant time to align the angular momentum vector with the axis of rotation producing the torque. Since the period of precession is generally independent of the angular separation between the earth's and the gyroscope's rotational axes, and the angular momentum vector is limited to an operating minimum by the spin rate and physical properties of the rotor, the time necessary to achieve alignment within a specified degree of accuracy will generally be significant and will increase dramatically as accuracy narrows.

U.S. Pat. No. 3,987,555 to Haagens discloses a north-seeking gyroscope utilizing capacitance sensing elements to measure torsional displacement of the rotor about a specialized hinge which provides two degrees of freedom for the rotor. The Haagens '555 system thereby uses the effect of the earth's spin on the sensing elements to detect the orientation of the earth's spin axis. However, the Haagens '555 system requires synchronizing the charging half-cycles of the capacitance sensing elements with the orientation of the rotor, and preferably utilizes a closed-loop servo system to null the output signal of the sensing elements by reorienting the axis of rotation of the rotor at 45° relative to the earth's axis of rotation. The Haagens '555 system can alternately rely upon splitting the output signal into two channels representing orthogonal sectors, and vectoring the signals to resolve geographic north. However, this also requires a more complex modulation control and signal filtering system, and would operate more slowly than the closed-loop servo embodiment.

U.S. Pat. No. 3,938,256 to Crocker discloses a two-degree-of-freedom north-seeking gyrocompass utilizing a servo system to null the output signal that is described as quick settling and being capable of providing an accurate short-reaction-time heading reference. The Crocker '256 system describes using a four gimbal assembly and circuits for compensating erection error signals to reduce the settling time for a conventional north-seeking gyroscope from several days to approximately 30 minutes (±10%) for acceptable operating accuracies.

Various other improvements in the mounting platforms, rotor configurations, and filter circuitry of north-seeking gyroscopes and heading reference systems are known to the art, with representative examples being shown in U.S. Pat. Nos. 3,750,300 to Tumback; 4,379,365 to Riethmüller; 4,442,723 to Auer; 4,443,952 to Schulien; 4,512,086 and 4,599,803 to Galuschak; 4,530,164 to Barriac; 4,461,089, 4,075,764 and 4,321,678 to Krogmann; 4,603,483 to Wing; 4,622,646 to Waller; 4,686,771 to Beveventano; 4,791,727 to Hojo; and 4,811,233 to Lauro. The accuracy and settling times for these systems vary significantly, as do their complexity, bulk, and cost. The gyrocompass disclosed in Galuschak '086 requires a settling time of approximately 6 minutes for maximum accuracy, which represents an improvement over Crocker '256, while Riethmüller '365 provides a rough estimate of geographic north with an accuracy of ±1.0° in less than one minute (including initial vertical alignment of the pendulous bodies, rotor start up, zeroing time, and two rough estimates taken aling orthogonal vectors) and two fine measurements requiring slightly greater time for greater accuracy.

BRIEF SUMMARY OF THE INVENTION

It is therefore one object of this invention to design an improved vibrating element angular rate sensor system of the tuning fork type in which the opposing sensing elements are closely spaced and rotated about an axis of rotation oriented perpendicular to their sensing axis. This configuration reduces susceptibility to noise without diminishing system sensitivity, and only the system bandwidth is dependent upon the separation distance between the opposing sensing elements.

It is another object of this invention to design the above angular rate sensor system such that its sensitivity is independent of the spin rate of the sensing elements, thereby permitting the system to be operated at reduced spin rates and calibrated independent of rotation to cancel out noise, as well as eliminating susceptibility to rotational perturbations.

It is an additional object of this invention to design the above angular rate sensor system such that it senses angular rate directly, and is therefore sensitive directly in phase with sensor element alignment to the sensitive axis.

It is a unique object of this invention to design the above angular rate sensor system such that it may be utilized in a north-seeking gyroscope embodiment wherein orientation to geographic north is determined by sensing the earth's spin rate vector through the vibrating sensing elements of the angular rate sensor and appropriate electronic filtering.

It is a related object of this invention to design the above angular rate sensor system such that the settling time of the north-seeking gyroscope embodiment is approximately 30-60 seconds to achieve a heading reference within ±0.1° of geographic north.

It is an object of this invention to design the above angular rate sensor system such that its weight is on the order of several ounces, and may be confined within a cylinder having overall dimensions of approximately 1"-2" in diameter and 3"-5" in length depending upon the particular embodiment, with designs for smaller and lighter embodiments being dictated more by the longitudinal arrangement of components rather than the separation distance of the sensing elements.

It is an additional object of this invention to design the above angular rate sensor system such that its cost is between one and two orders of magnitude less than a moderate inertial sensor of the type described above for use in aviation attitude and heading reference systems.

It is a unique object of this invention to design the above angular rate sensor system so as to provide a two axis low bias angular rate sensor capable of measuring angular rates for two axes over a wide range of angular rates, and which further provides extremely low bias.

It is a further object of this invention to design the above angular rate sensor system such that it may be utilized in combination with a second angular rate sensor to maximize angular rate sensing along a common desired sensing axis.

It is a related object of this invention to design the above angular rate sensor system such that it may be utilized in combination with a stationary angular rate sensor to enhance the bandwidth and DC response of the stationary angular rate sensor.

Briefly described, the angular rate sensor system of this invention comprises closely spaced vibrating drive and sensing elements in a paired tuning fork configuration mounted on a rotational drive assembly to rotate about an axis of rotation oriented perpendicular to the sensing axis of the sensing elements. The sensing elements are disposed within a housing which is mounted on a yoke affixed to the shaft of a drive motor. Alternately, the yoke and housing may be carried on one or more torsional masses or flywheels, which are in turn connected to the shaft of the drive motor, and may include a resilient coupling between the torsional masses.

The rotational drive assembly includes an encoder to permit referencing and modulation of the sensing element orientation. Electronic coupling means such as slip rings are used to transmit drive and output signals to and from the rotating elements. Each of the pair of sense and drive elements are disposed on opposing sides of the axis of rotation and generally symmetrical to one another with the sensing elements being parallel but non-aligned, and are positioned within the housing and relative to the axis of rotation such that the housing and angular rate sensor is balanced both laterally and longitudinally across the axis of rotation in the plane perpendicular thereto.

An earth-anchored version of the angular rate sensor system may be utilized in combination with an electronic filtering system to display a sinusoidal sensor output signal whose phase peak corresponds to the orientation of the sensing elements when their sensitive axes are most closely aligned with the earth's angular rate vector, thereby providing a heading reference to geographic north. This electronic filtering system includes a signal generator and phase-locked loop to control the drive motor speed in response to a drive shaft encoder, an AC amplifier to reject DC variations in the sensor output signal due to factors such as thermal bias, misalignment, or gravity, a bandpass filter to enhance the sinusoidal sensor output signal and reduce noise, a comparator to digitize the output signal, a second phase-locked loop to detect and track the phase difference between the output signal and the voltage controlled oscillator of the phase-locked loop, a counter-divider keyed to the voltage controlled oscillator of the second phase-locked loop to identify the running phase value, and a latch synchronized to the orientation of the sensing elements to discriminate and store the current phase value.

The north-seeking gyroscope embodiment of the angular rate sensor system may be utilized particularly in applications such as mining, surveying, or targeting artillery, and provides a settling time of approximately 30–60 seconds to resolve a heading reference to within ±0.1° of geographic north.

In one embodiment, the angular rate sensor system and rotational drive assembly together weigh a few ounces and may be confined within a cylindrical space having a diameter on the order of approximately 1"–2" and a length on the order of 3"–5". The angular rate sensor system reads angular rates directly and preferably operates at low spin rates (on the order of 50 Hz or less) with sensitivity being independent of spin rate. Only bandwidth is affected by spin rate.

A two axis low bias embodiment of the angular rate sensor system may be utilized alone or in combination with a similar system to provide complete angular rate sensing along a desired common axis, or with a second stationary angular rate sensor to enhance the bandwidth and DC response of the stationary angular rate sensor.

DESCRIPTION OF THE PREFERRED EMBODIMENTS

The angular rate sensor system of this invention is shown in FIGS. 1-7 and referenced generally therein by the numeral 10.

Figure 1:
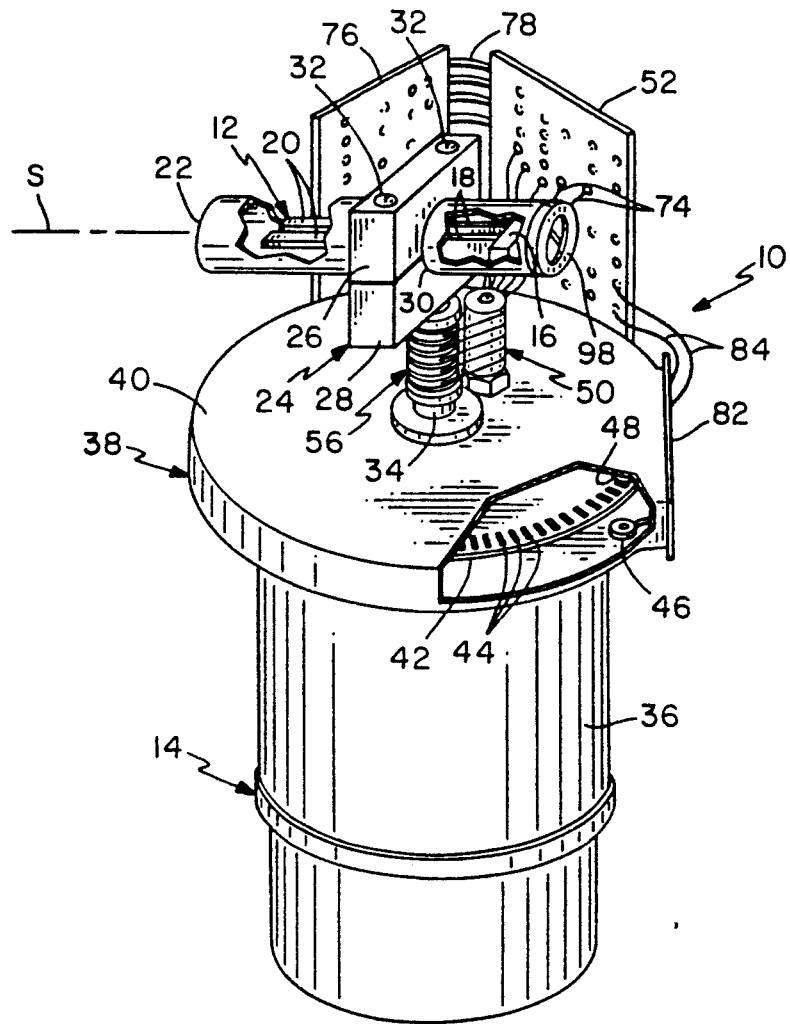
FIG. 1 is a perspective view of the angular rate sensor system of this invention.

Referring particularly to FIG. 1, it may be seen that the angular rate sensor system 10 of this invention comprises a vibrating element angular rate sensor of the tuning fork type 12, mounted for rotation about an axis of rotation R on a rotational drive assembly 14.

A conventional vibrating element angular rate sensor 12 of the tuning fork type which has proven suitable for the particular applications and embodiments discussed herein is disclosed in more complete detail in U.S. Pat. No. 4,628,734 to Watson. It is anticipated that the angular rate sensor disclosed in U.S. Pat. No. 4,671,112 to Kimura would similarly be suitable for such applications, as well as other angular rate sensors of the type utilizing paired vibrating drive and sensing elements.

Referring to FIG. 1, it may be seen that the vibrating element angular rate sensor 12 is composed of a mounting element 16, a pair of drive elements 18 or drive transducers extending from the mounting element 16, and a pair of sensing elements 20 or sensing transducers extending from the drive elements 18. The drive elements 18 are fixedly connected at their proximal ends to the mounting element 16 and extend perpendicularly from the mounting element 16 and are oriented with their major planar faces parallel to and confronting one another. Each sensing element 20 extends from and is fixedly connected to the distal end of one of the drive elements 18 in parallel alignment therewith, and are oriented such that their major planar faces are parallel to one another in the same plane and orthogonal to the drive elements 18. The drive elements 18 and sensing elements 20 are preferably piezoelectric ceramic crystals of the type know to the art which exhibit known flexure characteristics when energized with an electric current, and which whose flexure similarly induced an electric current therein. When the drive elements 18 are energized by an electronic drive signal through the use of a suitable drive circuit (not shown), the drive elements 18 will bend and vibrate in opposition to one another. Vibration of the drive elements 18 causes the sensing elements 20 to similarly vibrate in opposition to one another in a common inertial plane and about a common nodal axis, the frequency and magnitude of the vibration being dependent upon the drive signal and the physical resonance characteristics of the angular rate sensor 12. Movement of the angular rate sensor 12 about the sensing axis S causes a momentary and instantaneous shift in the inertial plane of the sensing elements 20, which induces stress on the sensing elements 20 and causes those sensing elements 20 to produce an electric current whose magnitude is proportional to the rate of change of the orientation of the inertial plane of the sensing elements 20. That electric current is amplified to produce an sensing signal output, which is filtered electronically to isolate angular rate characteristics and other data describing the physical movement of the angular rate sensor 12 and any object to which the mounting element 16 is fixedly attached. This angular rate sensor 12 configuration has become generally known as a vibrating element angular rate sensor of the tuning fork type. The specification of U.S. Pat. No. 4,628,734 describes the structure and operational characteristics of such an angular rate sensor in greater detail, and the specification of U.S. Pat. No. 4,479,098 describes one embodiment of a circuit for producing a suitable drive signal, and those specifications are incorporated herein by reference. It is understood that many other suitable structural configurations and drive circuits may be utilized with the angular rate sensor system 10 disclosed herein, as may be known to and appreciated by those skilled in the art or hereafter developed, and reference to the above specifications does not imply any limitation as to the operable embodiments of such an angular rate sensor system 10.

Referring again to FIG. 1, the angular rate sensor 12 is disposed within a cylindrical metal housing 22 that is disposed horizontally and clamped within a yoke structure 24 comprising top and bottom half members 26, 28 respectively. Each of the top and bottom half members 26, 28 of the yoke structure 24 include confronting or facing surfaces each defining mating portions of a circular aperture 30 whose diameter is generally equal to that of the housing 22. The housing is disposed within the aperture 30 of the yoke structure 24, and the top and bottom half members 26, 28 of the yoke structure 24 are releasably connected together at opposing ends thereof using a pair of threaded fasteners 32 or other suitable fastening means to clamp and securely engage the housing 22 and angular rate sensor 12 in a fixed position relative to the yoke structure 24. The yoke structure 24 is fixedly connected or attached to the top or distal end of a shaft 34 which extends upwardly from a drive motor 36 and through a shaft encoder 38.

The rotational axis of the shaft 34 is thus aligned along an axis of rotation R for the angular rate sensor 12, housing 22, and yoke structure 24. The sensing elements are disposed on opposing sides of the axis of rotation R, and are also disposed or side by side relation to one another. The sensitive axis S of the angular rate sensor 12, and the longitudinal or major physical axis of each sensing element 20, are therefore perpendicular to the axis of rotation R.

The drive motor 36 may be any one of several types known to the art for such applications, various types of motors having various advantages and disadvantages relative to one another given particular applications as may be appreciated by those skilled in the art. For example, a single phase fractional horsepower AC drive motor capable of voltage controlled spin rate (angular velocity) regulation at 50 Hz (3000 rpm) has proven suitable, however a three phase, split phase, capacitor start, shaded pole, or universal type motor may also be suitable. It is further anticipated that an electronically commutated DC brushless motor may be utilized to provide solid state switching rather than a segmented commutator to maintain continuous and uniform torque and to enhance speed control, however such a brushless DC motor generates more electronic noise and therefore requires greater isolation from the drive, sensing and filtering circuitry. It is also anticipated that a stepping motor would be suitable, preferably a 100 pole permanent magnet hybrid type stepping motor capable of step angle between 0.5 and 15 degrees, since such a stepping motor inherently has different harmonics than the input frequency from its signal generator, and which can then be filtered out directly. Various types of AC, brushless DC, and stepping motors also have different physical dimensions and characteristics affecting the selection of a suitable motor for a particular application, and it is understood that the selection of a preferable type drive motor 36 for a particular application is a matter of design choice for those of ordinary skill in the art.

Similarly, various types of shaft encoders 38 are known to the art for modulating and tracking the rotation, position, or angular velocity of a motor or rotating shaft 34. For purposes of illustration, an incremental electro-optical rotary encoder is shown in FIG. 1, although magnetic or conductive-contact encoders of the incremental or absolute type would be operable alternatives. The shaft encoder 38 shown includes an encoder housing 40, a transparent encoding disk 42 mounted concentrically on and perpendicular to the shaft 34 and having a definite plurality of uniform opaque lines or segments 44 radiating from and equallyn spaced around the periphery of the encoding disk 42, a LED or IRED source 46 incorporating a collimating lens, and a photodetector 48. An optical aperture (not shown) is disposed between the encoder disk 42 and the photodetector 48, such that a beam emitted by the LED or IRED source 46 is incident on the photodetector 48 only when a transparent portion of the encoding disk 42 and the optical aperture are aligned. This results in the beam being modulated by a shuttering or chopping effect whose frequency is determined by the shaft spin rate (angular velocity). A photodetector 48 in each of two channels converts the modulated beam into sinusoidal signals which are 90° out of phase, and these quadrature signals are amplified and conditioned to produce pulses in parallel channels that produce a directional output for counting or measuring shaft spin rate. The endcoder disk 42 may also include reference marker (not shown) which is keyed to the orentation of the sensitive axis S of the sensing elements 20.

Electronic coupling means 50 are utilized to transmit the drive signal from a stationary circuit board 52 to the rotating drive elements 18, and in turn transmit the output or sensing signal from the rotating sensing elements 20 to the stationary circuit board 52. The stationary circuit board 52 may be attached directly to or closely proximate the rotational drive assembly 14, or may be located in a remote location relative to the rotational drive assembly 14 and angular rate sensor 12. The stationary circuit board 52 may include some or all of the circuitry components necessary for controlling motor speed and shaft 34 spin rate, generating the drive signal, monitoring the sensing signal, electronic filtering, and any display or readout functions.

Figure 2:
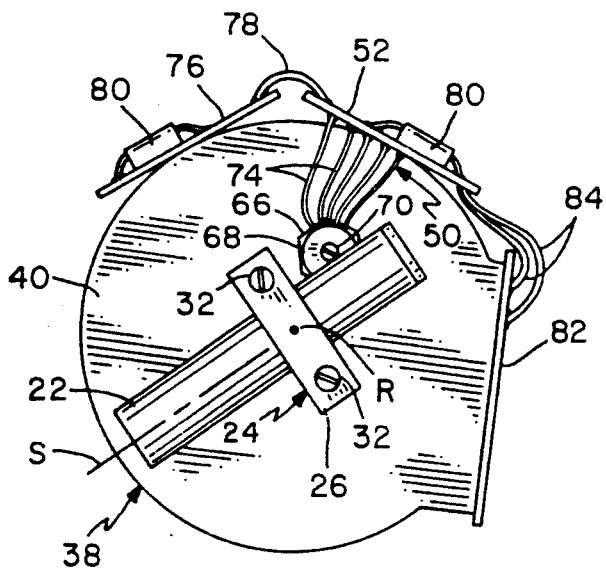
FIG. 2 is a top plan view of the angular rate sensor system of FIG. 1.
Figure 3:
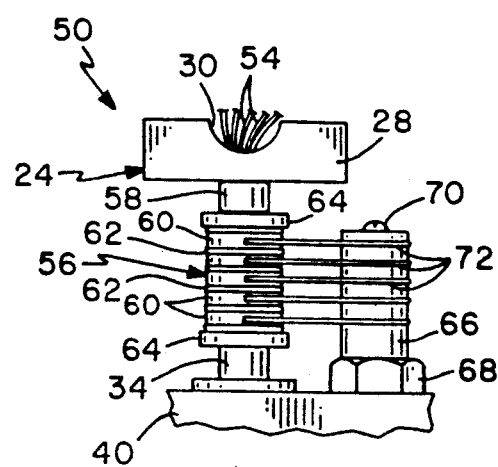
FIG. 3 is a side elevation view of the angular rate sensor system of FIG. 1 showing the slip ring embodiment of the electronic coupling means between the rotating angular rate sensor and the electronic filtering system in detail.

The angular rate sensor 12 will normally require access by five leads 54 representing a ground, two leads for drive signal, and two leads for sensing signal. The drive and sensing elements 18, 20 may be hard-wired to those leads, or the housing 22 or other portion surrounding the angular rate sensor 12 may be etched or have intermediate leads embedded therein. Referring particularly to FIG. 3, one suitable alternative is shown in which the leads 54 extend directly from the angular rate sensor 12 through the interior of the housing 22 and through a bore (not shown) defined by the bottom half member 28 of the yoke structure 24. The leads 54 are then connected to the upper end of a slip-ring structure 56 circumscribing the shaft 34 (or disposed above the top or distal end of the shaft 34 and circumscribing the axis of rotation R of the shaft 34.) The slip-ring structure 56 is physically connected to the yoke structure 24 by a hollow spacer 58 to rotate therewith, with the leads 54 extending downwardly to the slip-ring structure 56. The slip-ring structure 56 is composed of five highly conducive metal slip-rings 60 circumscribing the axis of rotation R of the shaft 34, each slip-ring 60 being electrically insulated from one another by an insulative disk 62, each slip-ring 60 and insulative disk 62 being mounted in a vertically aligned alternating column on an electrically insulative core 64 or spool-shaped body. The leads 54 each extend into the interior of the core 64 and are connected to one of the conductive slip-rings 60. Referring particularly to FIGS. 1-3, it may be seen that fixedly mounted or attached to the top planar surface of the encoder housing 40 is an electrically insulative vertical post 66. The electrically insulative vertical post 66 may be mounted to a base segment 68 using a threaded fastener 70 extending through a hollow bore (not shown) in the electrically insulative vertical post 66, or by other suitable fastening means. Five electrically conductive armatures 72 are fixedly connected to and carried on the electrically insulative vertical post 66 in vertically spaced-apart relation to one another, the distal ends of the armatures 72 each being constructed of a generally resilient segment of highly conductive metal which are exposed and aligned with and contact the very smooth outer cylindrical peripheral surface of one of the conductive slip-rings 60. Five leads 74 extend from the proximal ends of the armatures 72 to the stationary circuit board 52.

The electronic coupling means 56 may utilize other alternate devises to the physical contact or "runner" slip-ring structure 56, such as an optical or magneto-optical relays, "liquid" slip rings, or capacitance (inductance) coupling. The physical contact slip-ring structure 56 shown in FIGS. 1-3 has the advantage of being relatively inexpensive and available, however even with extremely smooth slip-rings 60 and vibrational damping of the armatures 72 the contact between the armatures 72 and rotating slip-rings 60 will inevitably cause some noise in the form of phase offset that affects calibration.

Referring again to FIGS. 1 and 2, it may be seen that one alternative is to provide an auxiliary stationary circuit board 76 which wraps around the rotational drive assembly 14 and is connected to the first stationary circuit board 52 by connectors 78, with various components 80 of the drive, sensing and filtering circuitry disposed on the two circuit boards 52, 76 and separated to minimize any background interference between separate circuits. The electronic components of the shaft encoder 38 are typically internalized and connected to a panel 82 disposed along one side of the encoder housing 40, with leads 84 and a standardized modular connector (not shown) extending externally from the panel 84. Alternately, the leads 84 may be hard-wired to the stationary circuit board 52 and thereby connected to the operative drive motor regulation circuit.

Figure 4:
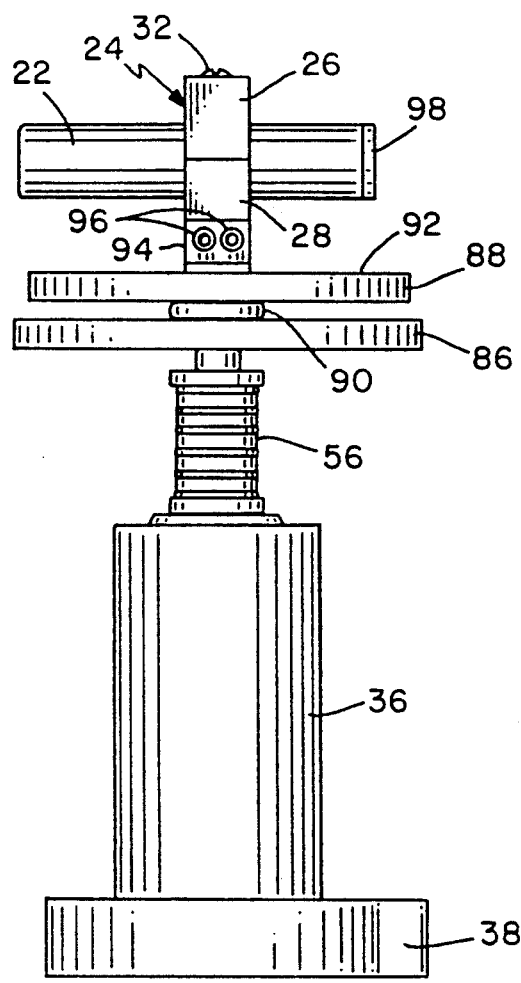
FIG. 4 is a side elevation view of an alternate embodiment of the angular rate sensor system of this invention utilizing torsional masses.

An alternate embodiment of the angular rate sensor system 10 using a modified rotational drive assembly 14 is diagrammatically shown particularly in FIG. 4. In this embodiment, the shaft encoder 38 is disposed vertically beneath the drive motor 36 and attached to the base end of the shaft 34. A slip-ring structure 56 or other suitable transfer component of an electronic coupling means 50 is disposed directly above the drive motor 36. The shaft 34, spacer 58, or top of the slip-ring structure 56 is fixedly connected to the a first torsional mass 86 or flywheel comprising a uniform density disk having its major rotational axis and center of mass oriented and aligned along the axis of rotation R of the shaft 34. The first torsional mass 86 may be utilized alone, or in combination with a second torsional mass 88 which is connected to the first torsional mass 86 by a resilient coupling 90. The resilient coupling 90 transmits torque uniformly and consistently between the first and second torsional masses 86, 88 when they are rotating at a predetermined spin rate (angular velocity) and reduces the noise and effects of torsional surges that are synchronous with the motor phase rotation caused by stator and rotor alignment, but provides a measure of vibrational damping and inertial lag on rotational start-up for the second torsional mass 88. Both of the first and second torsional masses 86, 88 preferably have moderate to high rotational moments of inertia to the extent that undue inertial strain is not placed on the drive motor 36 upon start-up.

The yoke structure 24 and housing 22 containing the angular rate sensor 12 is connected to and carried on the top planar surface 92 of the uppermost or second torsional mass 88 using a pair of L-shaped brackets 94 and suitable threaded fasteners 96 such as hex or Allen-screws, or another suitable fastening and mounting means.

Referring particularly to FIGS. 1–4, it may be seen that one or both ends the housing 22 enclosing the angular rate sensor 12 may be sealed or closed with a removable cap 98 which permits access to the angular rate sensor 12 for maintenance, replacement, or adjustment, and which itself may be utilized to permit adjustment or fine tuning of the position of the angular rate sensor 12 relative to the axis of rotation R. It is understood that the axis of rotation R for the angular rate sensor 12 will be in parallel alignment with the rotational axes of both the shaft 34 and yoke structure 24. As such, since each of the pair of sensing elements 20 and drive elements 18 are disposed on opposing sides of the axis of rotation R and will be generally symmetrical to one another across a vertical plane defined by the longitudinal or sensitive axis S and the axis of rotation R which is orthogonal thereto, the angular rate sensor 12 must be positioned within the housing 22 and the housing positioned within the yoke structure 24 such that the angular rate sensor 12 and housing 22 are balanced both longitudinally (parallel with the sensitive axis S) and laterally (orthogonal to both the sensitive axis S and the axis of rotation R) such that the effective center of mass is along or as close as practicable to the axis of rotation R to prevent vibration, wobble, or distortion. Similarly, where practicable, the position and physical dimensions of the housing 22 and angular rate sensor 12 therein may be adjusted such that the nodal axis of the angular rate sensor 12, or conversely the effective center of mass of the two vibrating sensing elements 20, is intersected by the axis of rotation R.

North-Seeking Gyroscope

One particular application of the above angular rate sensor system 10 is in a north-seeking gyroscope or gyrocompass. In such an embodiment, the angular rate sensor system 10 is anchored or "strapped-down" relative to the earth's surface such that the axis of rotation R of the angular rate sensor 12 is vertically aligned. In this case, vertically aligned might encompass normal to the local horizon or surface, but is preferably meant to be as close to parallel with the localized component of the earth's centripetal acceleration vector or gravitational force vector as is practicable under the particular circumstances.

Figure 5:
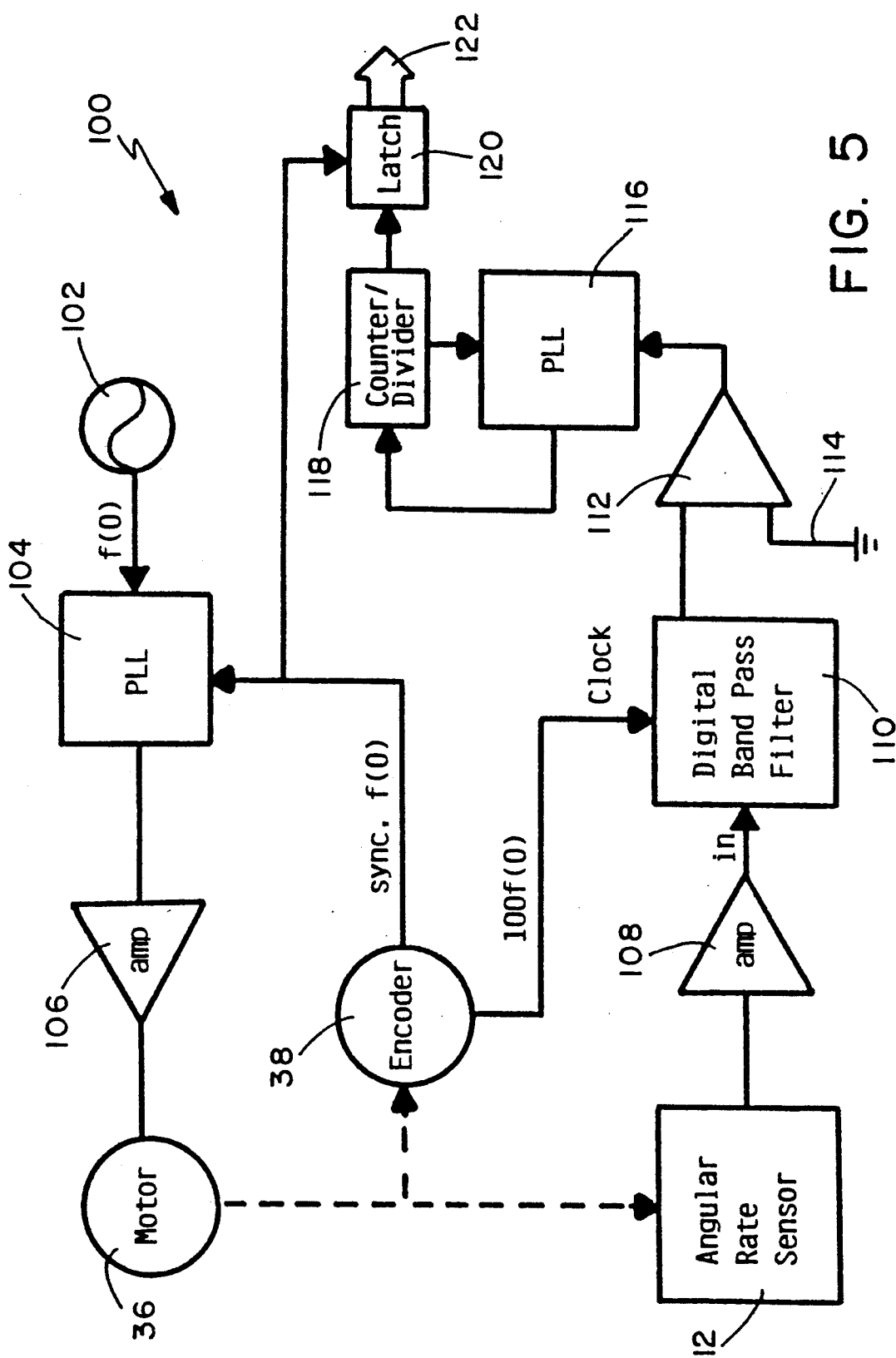
FIG. 5 is a block diagram showing the electronic filtering system utilized with the north-seeking gyroscope embodiment of the angular rate sensor system of this invention.

The north-seeking gyroscope embodiment of the angular rate sensor system 10 preferably incorporates a particular electronic filtering circuit 100 which is shown diagrammatically in FIG. 5.

Referring to FIG. 5, it may be seen that the angular rate sensor 12, drive motor 36, and shaft encoder 38 are represented diagrammatically. An oscillator or signal generator 102 produces an AC signal which is passed through a first phase-locked loop 104 and amplified by a first AC amplifier 106 to provide drive voltage for the drive motor 36. The shaft encoder 38 coupled to the shaft 34 of the drive motor 36 provides a first modulated or digital synchronization output corresponding to the spin rate of the shaft 34 and angular rate sensor 12, that first synchronization output being timed at one pulse per revolution of the shaft 34. This signal is fed back to the first phase-locked loop 104 to form a closed-loop drive circuit which controls the spin rate (angular velocity) of the shaft 34 and angular rate sensor 12, and maintains the spin rate for the angular rate sensor 12 at a uniform and constant level. As discussed further below, one suitable spin rate would be 50 Hz.

Rotation of the angular rate sensor 12 about the axis of rotation R produces a sinusoidal sensor output signal (earth rate sinusoid) whose phase peak corresponds to the orientation of the sensitive axis S of the sensing elements 20 when the sensitive axis S is most closely aligned with the earth's angular rate vector (spin axis or geographic north.) This sensor output signal would have a peak value given by the equation $S_m = k \cos$ (latitude), in which $S_m$ is the peak output signal value, the constant $k = 0.0041667$ degrees per second, and the latitude is that for the location of the angular rate sensor.

The sensor output signal is processed through a second AC amplifier 108 which effectively factors out DC offsets or variations resulting from such factors as thermal bias, gravitational misalignment and local fluctuation in gravitational field intensity and orientation due to geological formations or the like. The processed and amplified sensor output signal will thus reflect the earth rate sinusoid and any noise intrinsic to the system 10.

The sensor output signal is then processed through a digital band pass filter 110 to enhance the sinusoidal signal and reduce noise, the band pass filter 110 being clocked by a second synchronization output timed at 100 pulses per revolution from the shaft encoder 38.

The phase of this resulting sensor output signal can then be used to identify a heading for geographic north. The sensor output signal from the bandpass filter 110 is then digitized by a comparator 112 which incorporates a system ground 114, and filtered by a second phase-locked loop 116. The second phase-locked loop 116 incorporates a counter/divider system 118 which identifies a running digital "wood" or base data value representing the current momentary or instantaneous phase value, with the reference signal from the voltage controlled oscillator (VCO) of the second phase-locked loop 116 being input to the counter/divider system 118. The current standing or iterated phase value is forwarded or "strobed" to a latch 120 which is referenced against the first (one pulse per revolution) synchronizing output of the shaft encoder 38. With the rotational orientation of the shaft 34 and sensitive axis S of the sensing elements 20 keyed to the physical orientation of the angular rate sensor system 10, the resultant phase value may be processed and formulated to display either a numeric, graphic, or physical readout designating the geographic north heading on a suitable display device 122, or alternately display a deviation between geographic north and a fixed physical reference or alignment system associated with the angular rate sensor system 10 as in a compass or a steering signal to a designated point on a fixed heading.

It should be noted that in most circumstances the term "phase-locked loop" connotes a device for modulating or demodulating a carrier frequency, and employing a lowpass filter and phase detector in parallel with a voltage controlled oscillator. "Comparator" generally refers to a circuit having two or three outputs which evaluates and indicates whether two signals are matched, and may test for amplitude, phase, frequency, etc. In the case of phase and frequency comparators, the output voltage generally varies depending upon which of the input signals is leading or lagging. The term "phase-comparator" may be used to refer in general to the portion of a phase-locked loop whose voltage varies depending upon the phase of two oscillating input signals and acts to force the test signal back and forth until it is in phase with the reference signal. Consequently, the phase-locked loop will drive an signal error toward zero frequency and lock the voltage controlled oscillator (VCO) of the phase-locked loop to the input frequency, thus controlling output phase when the frequencies are equal. A "counter" generally refers to a binary counter or chain of flip-flops which divide progressively by multiples of two, and may include a counting register to count orders of places or a shift register to shift the count between chains of flip-flops for each binary place in the count. A divider includes a circuit for splitting voltages or currents, such as a resistive network to bias transistor oscillators and amplifiers, and similarly a circuit that performs mathematical division such as in a frequency counter to regulate gate time or produce a frequency controlled pulse rate. As such, it is understood that the use of certain terminology involving the phase-locked loops 104, 116, comparator 112, and counter/divider system 120 will be readily appreciated by those of ordinary skill in the applicable art, particularly with reference to FIG. 5 herein.

In the north-seeking gyroscope embodiment, there is a balancing of response time and accuracy through selection of the appropriate Q-factor (or "Q") in the bandpass filter. Based upon a spin rate (angular velocity) of 50 Hz (3000 rpm) and noise levels of approximately 0.05 degrees per second RMS, a Q of approximately 6000 would result in fixing a heading to within ±0.1° within 60 seconds over a substantial proportion of the earth's surface. In other applications, a bandpass filter may be utilized having a Q ranging down to and below 2000.

Two Axis Low Bias Angular Rate Sensor

Another particular application of the angular rate sensor system 10 of this invention is the two axis low bias angular rate sensor, which utilizes the angular rate sensor system 10 of this invention with a specialized electronic circuit 124 adapted to utilize amplitude outputs instead of phase measurements, and optimized to resolve angular rates in two axes over a wide range.

Figure 6:
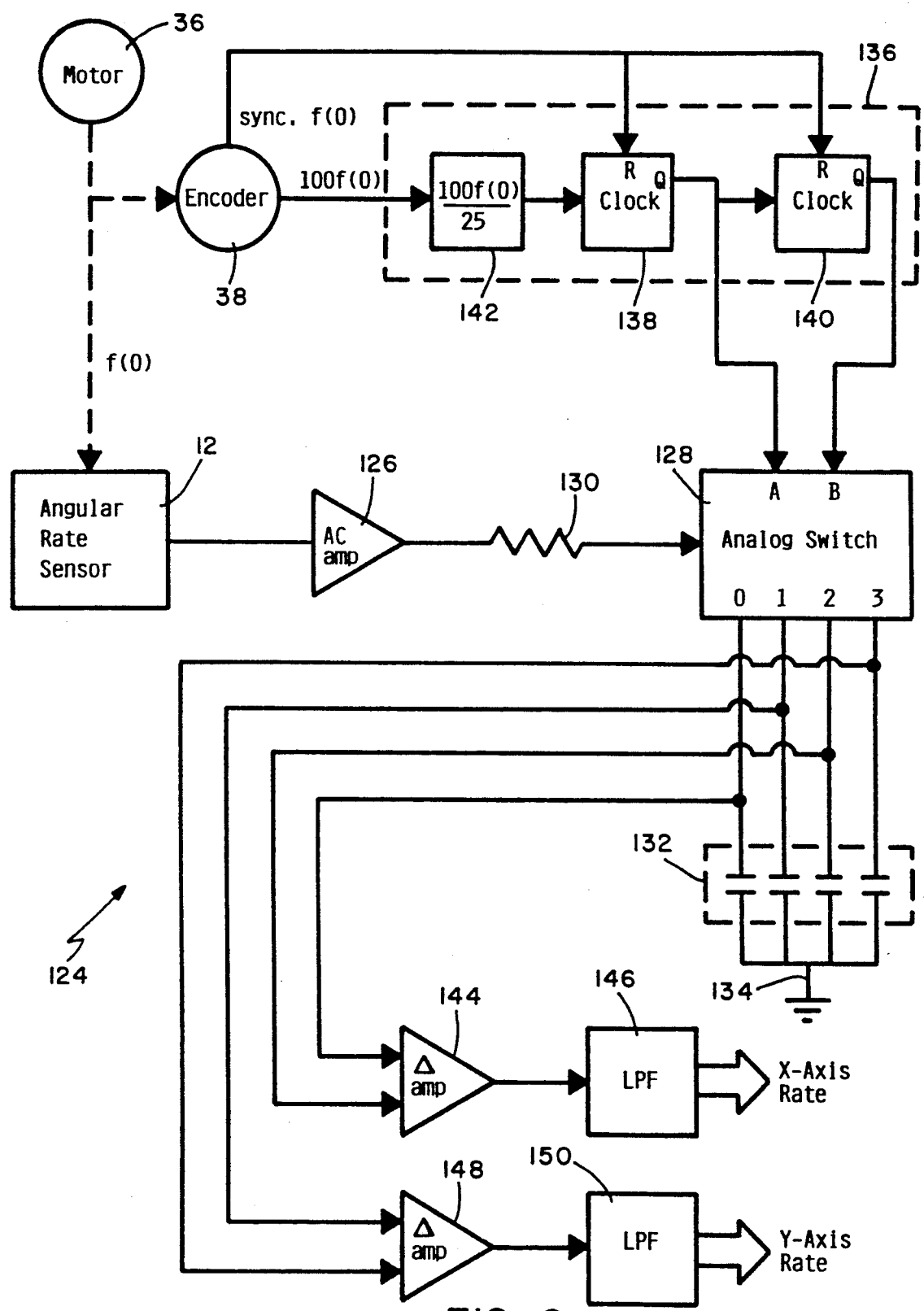
FIG. 6 is a block diagram showing the electronic filtering system utilized with the two axis low bias embodiment of the angular rate sensor system of this invention.

Referring particularly to FIG. 6, it may be seen that in contrast to the north-seeking gyroscope embodiment and electronic filtering circuit 100, the two axis low bias embodiment does not require a closed-loop drive circuit to control the spin rate (angular velocity) of the shaft 34 and angular rate sensor 12, since phase shift or jitter is not a significant factor. The sensor output signal output from the angular rate sensor 12 is similarly processed by an AC amplifier 126 to reject DC offsets or bias components such as thermal bias, misalignment, and turn-on drift.

The amplified sensor output signal is then sent to an analog switch 128 via an impedance path 130, with the analog switch 128 being driven to commutate the rate signal to four capacitors 132. The four capacitors 132 are arrayed in parallel and linked to a common ground 134, and are each connected to one of the four output channels (0, 1, 2, and 3) of the analog switch 128. The rate signal is synchronously related to each of the four quadrants of the rotation cycle or path of the angular rate sensor 12 by a counter circuit 136 that incorporates a divide-by-four ripple-type counter utilizing two flip-flops 138, 140. The counter circuit 136 receives input from two synchronization outputs from the shaft encoder 38, the first timed at one pulse per revolution and the second timed at 100 pulses per revolution, with the second synchronization output either being quartered using a conventional counter/divider circuit 142 keyed to the orientation of the sensitive axis S and the associated quarters or quadrants of the encoder disk 42, or through the use of a specialized encoder disk 42 having a band of timing segments 44 spaced to produce the desired synchronization output pulse rate. The counter circuit 136 incorporates a divide-by-four ripple-type counter utilizing two flip-flops 138, 140, with the quartered second synchronization output connected to the clock input of the first flip-flop 138, and the Q output of the first flip-flop 138 connected to the clock input of the second flip-flop 140. The Q outputs of each flip-flop 138, 140 are connected to one of the gate or control inputs (A, B) of the analog switch 128. Consequently, the control circuit 136 produces a switching signal at control inputs A, B of the analog switch 128 at times corresponding to the sensitive axis S passing a point at the boundary of each of the four predetermined quadrants, with the sensor output signal being switched consecutively from an initial channel (0) to the intermediate channels (1, 2) to the last channel (3) and then returning to the initial channel (0). The initial channel (0) will maintain the average voltage of the sensor output signal while the sensitive axis is in the X-axis positive direction. The second intermediate channel (2) will maintain the average voltage of the sensor output signal while the sensitive axis is in the X-axis negative direction. The values for the average voltage between the X-axis positive and X-axis negative directions, initial channel (0) and second intermediate channel (2), are subtracted using a differential amplifier 144 to provide a resultant gain for the X-axis, and to cancel all influences not resulting from a change in orientation of the angular rate sensor 12. (For an angular rate $\Omega$ applied to the X-positive axis producing an output voltage of B+k$\Omega$, and producing an output voltage of B-k$\Omega$ when realigned 180° to the X-negative axis, the resultant output voltage or gain would be 2 k$\Omega$). The resultant gain for the X-axis is processed through a lowpass filter 146 to augment attenuation, and the signal output provides the X-axis angular rate. Similarly, the values for the average voltage between the Y-axis positive and Y-axis negative directions, first intermediate channel (1) and last channel (3), are subtracted using a differential amplifier 148 to provide a resultant gain for the Y-axis. The resultant gain for the Y-axis is processed through a lowpass filter 150 to augment attenuation, and the signal output provides the Y-axis angular rate.

Such a two axis low bias embodiment provides excellent bias characteristics, but response is limited in bandwidth. The spin rate (angular velocity) and bandwidth should be compatible as a top limit, so that if the bandwidth is 50 Hz, the spin rate (angular velocity) of the angular rate sensor 12 should not exceed 50 Hz, The output bandwidth should also be considered as part of the bottom limit, such that angular rate sensor 12 output bandwidth is 10 Hz, the preferred spin rate (angular velocity) of the angular rate sensor 12 should be approximately 25 Hz according to Nyquist stability criterion.

To greatly extend the bottom limit as determined by the output bandwidth, two angular rate sensors 12 may be utilized in an orthogonal orientation to to obtain complete coverage of the sensitive (desired) axis at all times. This effectively doubles the number of samples taken per revolution along the desired axis, and lowers the filtering requirements. Although more than two sensors could be utilized as described, the degree of enhancement is subject to rapidly diminishing returns.

Figure 7:
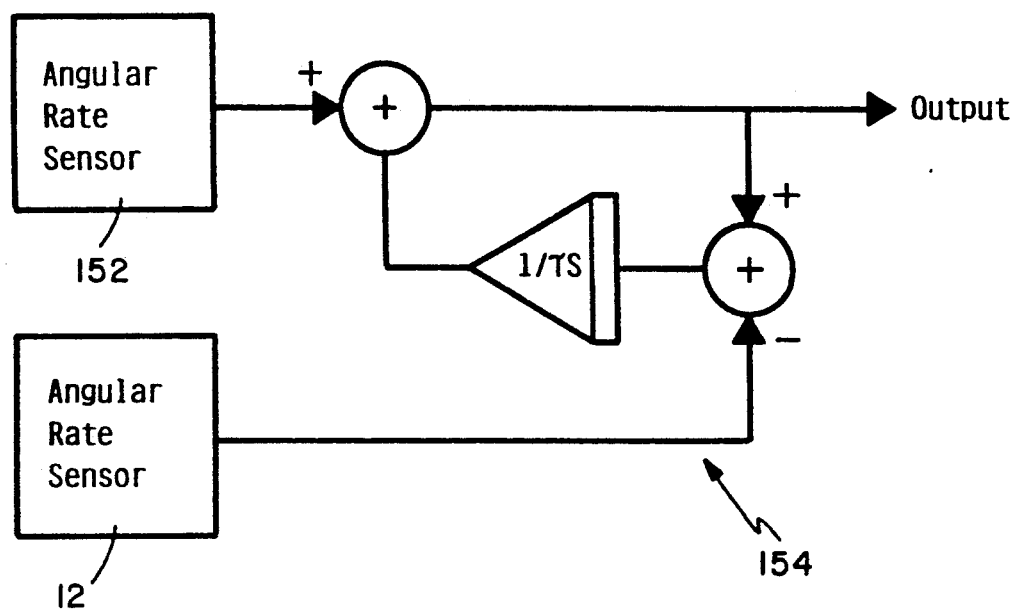
FIG. 7 is a block diagram showing the electronic filtering system utilized to wash out bias of a stationary angular rate sensor utilized in combination with a rotating two axis low bias angular rate sensor of this invention.

Bandwidth may also be extended by using a second but stationary angular rate sensor 152 aligned along the sensitive (desired) axis. The bias of this second stationary angular rate sensor 152 is "washed out" to match the near-perfect bias of the first rotating angular rate sensor 12 using a simple compensation circuit 154 as shown in FIG. 7, thus providing the second stationary angular rate sensor 152 with full bandwidth and improved DC response.

The principles utilized in the angular rate sensor system 10 may be compared to the concept of a chopper stabilization amplifier. An input signal is applied to an amplifier in a positive and negative manner, with the output being demodulated, synchronized, and applied to a lowpass filter. The result is that bias errors are applied positively and negatively to the output from directly opposing quadrants and sum to zero, given average bias errors of equivalent effect and magnitude between directly opposing quadrants, producing a resultant signal substantially free of system bias errors. This remains true to the extent that the primary source of signal offset in the angular rate sensor 12 is from the drive and sensing elements 18, 20.

While the preferred embodiment of the above angular rate sensor system 10 has been described in detail with reference to the attached drawing Figures, it is understood that various changes and adaptations may be made in the angular rate sensor system 10 without departing from the spirit and scope of the appended claims.

What is claimed is:

1. An angular rate sensor system, said angular rate sensor system being utilized with a drive signal generator and a sensor output signal processing circuit, said angular rate sensor system comprising:

a vibrating element angular rate sensor having at least one sensing element and a sensitive axis, said sensing element vibrating generally within a plane of vibration;

a drive motor having a shaft, said shaft being mounted for rotation and defining an axis of rotation;

mounting means for connecting said vibrating element angular rate sensor to said shaft such that said sensitive axis is oriented generally perpendicular to said axis of rotation, said plane of vibration is generally perpendicular to said axis of rotation, and said vibrating element angular rate sensor rotates about said axis of rotation with said shaft;

electronic coupling means for coupling said vibrating element angular rate sensor with the drive signal generator and with the sensor output signal processing circuit; and synchronization means for synchronizing the rotation of said vibrating element angular rate sensor with said sensor output signal processing circuit.

2. The angular rate sensor system of claim 1 wherein the vibrating element angular rate sensor is of the tuning fork type, and wherein the number of the sensing elements is two.

3. The angular rate sensor system of claim 2 wherein the sensing elements are closely spaced from one another and oppose one another in a generally non-aligned parallel side-by-side configuration, the sensing elements being generally disposed on opposing sides of the axis of rotation from one another.

4. The angular rate sensor system of claim 2 wherein the vibrating element angular rate sensor further comprises:

a mounting element; and a pair of drive elements, each of said pair of drive elements having a proximal end and a distal end and a major planar face, said proximal end of each of said pair of drive elements being connected to said mounting element such that each of said pair of drive elements extends from said mounting element with said major planar faces of each of said pair of drive elements facing one another, a first one of the sensing elements being connected to said distal end of a corresponding first one of said pair of drive elements and extending therefrom and generally parallel therewith, a second one of the sensing elements being connected to said distal end of a corresponding second one of said pair of drive elements and extending therefrom and generally parallel therewith, each of the sensing elements having a major planar face oriented generally orthogonal to said major planar face of said corresponding first one and said corresponding second one of said pair of drive elements from which the first one of the sensing elements and the second one of the sensing elements extend.

5. The angular rate sensor system of claim 1 wherein the drive motor rotates the shaft at an angular velocity in response to an input voltage, said angular velocity being generally proportional to said input voltage supplied to the drive motor and selectively variable therewith.

6. The angular rate sensor system of claim 1 wherein the vibrating element angular rate sensor is of the tuning fork type and is rotated at an angular velocity, said angular velocity being approximately 50 Hz.

7. The angular rate sensor system of claim 1 wherein the drive motor is generally of the single phase fractional horsepower alternating current type.

8. The angular rate sensor system of claim 1 wherein the shaft has a top end and wherein the mounting means comprises:
  a housing, said housing generally enclosing the vibrating element angular rate sensor; and
  a yoke structure, said yoke structure being connected to the top end of the shaft, said yoke structure having a top member and a bottom member, said top member and said bottom member being releasably connected to one another in mating relation and defining an aperture, said yoke structure receiving and securely engaging said housing within said aperture.

9. The angular rate sensor system of claim 8 wherein the housing may be selectively moved relative to the yoke structure to adjust the position of the vibrating element angular rate sensor relative to the axis of rotation.

10. The angular rate sensor system of claim 8 wherein the housing may be selectively rotated relative to the yoke structure to adjust the orientation of the vibrating element angular rate sensor relative to the axis of rotation.

11. The angular rate sensor system of claim 1 wherein the electronic coupling means comprises:
  a first plurality of electrically conductive leads electronically connected to the vibrating element angular rate sensor;
  a plurality of electrically conductive slip rings, each of said plurality of electrically conductive slip rings being rotatably mounted for rotation with the shaft and about the axis of rotation, each of said plurality of electrically conductive slip rings being insulated from one another;
  a plurality of electrically conductive armatures, each of said plurality of electrically conductive armatures being generally fixedly mounted to a base and extending therefrom such that each of said plurality of electrically conductive armatures contacts a one of said plurality of electrically conductive slip rings, each of said plurality of electrically conductive armatures being insulated from one another; and
  a second plurality of electrically conductive leads, each one of said second plurality of electrically conductive leads being electrically connected to a corresponding one of said plurality of electrically conductive armatures, each of said second plurality of electrically conductive leads further being electrically connected to a corresponding one of the drive signal generator or the sensor output signal processing circuit.

12. The angular rate sensor system of claim 1 wherein the synchronization means comprises:
  an encoder, said encoder being connected to the shaft such that said encoder produces at least one synchronization signal responsive to the rotation of the shaft.

13. The angular rate sensor system of claim 12 wherein the synchronization signal produced by the encoder indicates both the angular orientation of the sensitive axis relative to a fixed point on the encoder and the angular velocity of the sensitive axis as the vibrating element angular rate sensor rotates about the axis of rotation.

14. The angular rate sensor system of claim 12 wherein the encoder is generally of the incremental electro-optical rotary type.

15. An angular rate sensor system, said angular rate sensor system being utilized with a drive signal generator and a sensor output signal processing circuit, said angular rate sensor system comprising:
  a vibrating element angular rate sensor having at least one sensing element, said sensing element being vibrated within a plane of vibration in response to the drive signal generator, said vibrating element angular rate sensor producing a sensor output signal, said vibrating element angular rate sensor having a sensitive axis;
  means for rotating said vibrating element angular rate sensor about an axis of rotation, said axis of rotation being oriented generally perpendicular to said sensitive axis of said sensing element and to said plane of vibration;
  mounting means for connecting said vibrating element angular rate sensor to said means for rotating said vibrating element angular rate sensor; and
  electronic coupling means for coupling said vibrating element angular rate sensor with the drive signal generator and with the sensor output processing circuit.

16. The angular rate sensor system of claim 15 wherein the vibrating element angular rate sensor comprises:
  a mounting element;
  a pair of drive transducers, each of said pair of drive transducers having a proximal end and a distal end and a major planar face, said proximal end of each of said pair of drive transducers being connected to said mounting element such that each of said pair of drive transducers extends from said mounting element with said major planar faces of each of said pair of drive transducers facing one another; and
  a pair of sensing transducers, each one of said pair of sensing transducers being connected to said distal end of a one of said pair of drive transducers and extending therefrom and generally parallel therewith, each of said pair of sensing transducers having a major planar face oriented generally orthogonal to said major planar face of said one of said pair of drive transducers from which a corresponding one of said pair of sensing transducers extends, said pair of sensing transducers being closely spaced and opposing one another.

17. The angular rate sensor system of claim 15 further comprising:
synchronization means for synchronizing the rotation of the vibrating element angular rate sensor with the sensor output signal processing circuit.

18. The angular rate sensor system of claim 17 wherein the synchronization means comprises:
an encoder, said encoder being connected to the vibrating element angular rate sensor such that said encoder produces at least one synchronization signal responsive to the rotation of the vibrating element angular rate sensor about the axis of rotation.

19. The angular rate sensor system of claim 18 wherein the synchronization signal produced by the encoder indicates both the angular orientation of the sensitive axis relative to a fixed point on the encoder and the angular velocity of the sensitive axis as the vibrating element angular rate sensor rotates about the axis of rotation.

20. The angular rate sensor system of claim 15 wherein the vibrating element angular rate sensor has a rotational moment of inertia, said angular rate sensor system further comprising:
a first torsional mass, said first torsional mass being mounted for rotation about the axis of rotation, the vibrating element angular rate sensor being connected to and carried on said first torsional mass as said first torsional mass rotates, said first torsional mass generally increasing the rotational moment of inertia of the angular rate sensor system.

21. The angular rate sensor system of claim 20 wherein the first torsional mass is a generally cylindrical disk having a generally uniform density.

22. The angular rate sensor system of claim 20 further comprising:
a second torsional mass, said second torsional mass being connected to the first torsional mass by a connector and rotatable about the axis of rotation therewith, said connector being sufficiently resilient to transmit torque from the first torsional mass to said second torsional mass in a generally uniform manner as the first torsional mass and said second torsional mass are rotated at a generally constant angular velocity, said connector being sufficiently flexible to provide a measure of vibrational damping between the first torsional mass and said second torsional mass and to provide a measure of inertial lag between the first torsional mass and said second torsional mass as the angular velocity thereof is increased or decreased.

23. A sensor output signal processing circuit for use in combination with an angular rate sensing means of the vibrating element type, said angular rate sensing means including at least one sensing element having a sensitive axis oriented generally perpendicular to an axis of rotation about which said sensing element rotates, said sensing element producing a sensor output signal responsive to changes in the angular rate thereof, a drive signal generator connected to said sensing element and producing a drive signal which vibrates said sensing element in a plane of vibration generally perpendicular to said axis of rotation, and a synchronization means producing at least one synchronization signal responsive to the rotation of said sensing element about said axis of rotation, said sensor output signal processing circuit comprising:
a filter means electrically connected to the sensing element for filtering noise from and enhancing the sensor output signal, said filter means further being electrically connected to the synchronization means and receiving a first synchronization signal therefrom to clock the sensor output signal;
a comparator means electrically connected to said filter means for digitizing the sensor output signal received from said filter means; and
a first phase-locked loop means electrically connected to said comparator means for filtering the sensor output signal received from said comparator means, said first phase-locked loop means further being electrically connected to a counter/divider means and to a latch means for identifying and holding a phase value of the sensor output signal received from said comparator means, said counter/divider means or said latch means further being electrically connected to said synchronization means and receiving a second synchronization signal therefrom,
whereby the phase value of the sensor output signal may be used to determine a heading reference relative to the orientation between the sensitive axis and geographic north.

24. The sensor output signal processing circuit of claim 23 wherein the filter means is a digital filter.

25. The sensor output signal processing circuit of claim 23 wherein the filter means is a band pass filter.

26. The sensor output signal processing circuit of claim 23 wherein the first synchronization signal is timed at approximately one hundred pulses per revolution of the sensing element.

27. The sensor output signal processing circuit of claim 23 wherein the comparator means is grounded.

28. The sensor output, signal processing circuit of claim 23 wherein the second synchronization signal is timed at approximately one pulse per revolution of the sensing element.

29. The sensor output signal processing circuit of claim 23 wherein the sensing element is rotated by a drive motor which receives a motor drive signal from a motor drive signal generator, the sensor output signal processing circuit further comprising:
a second phase-locked loop means electrically connected to the motor drive signal generator for filtering and modulating the motor drive signal, said second phase-locked loop means further being electrically connected to the synchronization means and receiving the second synchronization signal therefrom.

30. The sensor output signal processing circuit of claim 29 further comprising:
an amplifier means electrically connected to the second phase-locked loop means and to the drive motor for amplifying the motor drive signal from the second phase-locked loop means.

31. The sensor output signal processing circuit of claim 23 further comprising:
an amplifier means electrically connected to the sensing element and to the filter means for amplifying the sensor output signal and eliminating direct current offsets from the sensor output signal.

32. The sensor output signal processing circuit of claim 31 wherein the amplifier means is an alternating current amplifier.

33. A sensor output signal processing circuit for use in combination with an angular rate sensing means of the vibrating element type, said angular rate sensing means including at least one sensing element having a sensitive axis oriented generally perpendicular to an axis of rotation about which said sensing element rotates in a plane, said plane being divided into four generally equal quadrants by an X-axis and a Y-axis, said X-axis and said Y-axis being generally orthogonal to one another and contained within said plane, said sensing element producing a sensor output signal responsive to the angular rate thereof, a drive signal generator connected to said sensing element and producing a drive signal which vibrates said sensing element, and a synchronization means producing at least one synchronization signal responsive to the rotation of said sensing element about said axis of rotation, said sensor output signal processing circuit comprising:

a counter circuit, said counter circuit being electrically connected to the synchronization means;

an analog switch, said analog switch being electrically connected to the sensing element to receive the sensor output signal therefrom and to the counter circuit to receive said first counter circuit signal and said second counter circuit signal therefrom, said analog switch further defining four output channels;

a first differential amplifier electrically connected to a first alternating pair of said output channels of said analog switch, said first alternating pair of said output channels corresponding to an X-axis positive mean gain and an X-axis negative mean gain of the sensor output signal, said first differential amplifier subtracting said X-axis negative mean gain and said X-axis positive mean gain to produce a resultant gain for the X-axis;

a second differential amplifier electrically connected to a second alternating pair of said output channels of said analog switch, said second alternating pair of said output channels corresponding to a Y-axis positive mean gain and Y-axis negative mean gain of the sensor output signal, said second differential amplifier subtracting said Y-axis negative mean gain and said Y-axis positive mean gain to produce a resultant gain for the Y-axis;

a first lowpass filter electrically connected to said first differential amplifier and receiving said resultant gain for the X-axis therefrom; and a second lowpass filter electrically connected to said second differential amplifier and receiving said resultant gain for the Y-axis therefrom, whereby the first lowpass filter produces a signal corresponding to the X-axis angular rate of the sensing element and the second lowpass filter produces a signal corresponding to the Y-axis angular rate of the sensing element.

34. The sensor output signal processing circuit of claim 33 wherein the at least one synchronization signal includes a first synchronization signal and a second synchronization signal, and wherein the counter circuit further comprises:

a first flip-flop; and a second flip-flop, said first flip-flop being electrically connected to the synchronization means so as to receive the first synchronization signal and the second synchronization signal therefrom, said first flip-flop producing the first counter circuit output, said second flip-flop being electrically connected to the synchronization means to receive the second synchronization signal therefrom and being electrically connected to said first flip-flop to receive said first counter circuit output therefrom, said second flip-flop producing the second counter circuit output.

35. The sensor output signal processing circuit of claim 33 further comprising:

an amplifier electrically connected to and between the sensing element and the analog switch means.

36. The sensor output signal processing circuit of claim 35 wherein the amplifier is an alternating current amplifier.

37. The sensor output signal processing circuit of claim 36 further comprising:

an impedance device electrically connected to and between the amplifier means and the analog switch means.

38. The sensor output signal processing circuit of claim 33 further comprising:

four capacitors, each of said four capacitors being electrically connected to one of the four output channels of the analog switch, each of said four capacitors being electrically connected to one another in a parallel configuration.

39. The sensor output signal processing circuit of claim 38 wherein the four capacitors are grounded opposing the analog switch.

40. The sensor output signal processing circuit of claim 33 wherein the four output channels of the analog switch are designated as a zero channel, a channel one, a channel two and a channel three, the first alternating pair being said zero channel and said channel two, and the second alternating pair being said channel one and said channel three.

41. The sensor output signal processing circuit of claim 34 wherein the at least one synchronization signal includes a first synchronization signal, and wherein the counter circuit further comprises:

a counter/divider electrically connected to and between the synchronization means and the first flip-flop, said counter/divider dividing the first synchronization signal by a fixed number such that the first synchronization signal received by the first flip-flop is timed at four pulses per revolution of the sensing element.

42. The sensor output signal processing circuit of claim 41 wherein the at least one synchronization signal includes a first synchronization signal, and wherein the first synchronization signal is initially timed at approximately one hundred pulses per revolution of the sensing element, and the fixed number is approximately twenty five.

43. The sensor output signal processing circuit of claim 33 wherein the at least one synchronization signal includes a first synchronization signal, and wherein the first synchronization signal is timed at approximately four pulses per revolution of the sensing element.

44. The sensor output signal processing circuit of claim 33 wherein the at least one synchronization signal includes a first synchronization signal and a second synchronization signal, and wherein the second synchronization signal is timed at approximately one pulse per revolution of the sensing element.

* * * * *

UNITED STATES PATENT AND TRADEMARK OFFICE
CERTIFICATE OF CORRECTION

PATENT NO. : 5,272,922
DATED : December 28, 1993
INVENTOR(S) : William S. Watson It is certified that error appears in the above-indentified patent and that said Letters Patent is hereby corrected as shown below:

Column 7, line 49, delete "equallyn" and substitute --equally-- therefor.

Column 11, line 21, delete "wood" and substitute --word-- therefor.

Signed and Sealed this

Sixteenth Day of August, 1994

*Attest:*

BRUCE LEHMAN

*Attesting Officer*     *Commissioner of Patents and Trademarks*